May 12, 1970 N. ALWALL ETAL 3,511,381
DIALYSIS BLOOD DISTRIBUTION GROOVES
Filed March 4, 1968 3 Sheets-Sheet 1

INVENTORS
Nils Alwall
Bo Lennart Östergren
Nils Olov Vilhelm Hagstrom

By

Pierce, Scheffler & Parker
Attorneys

INVENTORS
Nils Alwall
Bo Lennart Östergren
Nils Olov Vilhelm Hagström
By Pierce, Scheffler & Parker
Attorneys INVENTORS
Nils Alwall
Bo Lennart Östergren
Nils Olov Vilhelm Hagström By Pierce, Schifflu & Parker
Attorneys United States Patent Office 3,511,381
Patented May 12, 1970

3,511,381
Nils Alwall, Bo Lennart Östergren, and Nils Olov Vilhelm Hagström, Lund, Sweden, assignors to AB Gambro, Lund, Sweden, a company of Sweden
Filed Mar. 4, 1968, Ser. No. 710,255
Claims priority, application Sweden, Mar. 6, 1967, 3,014/67
Int. Cl. B01d 31/00, 13/00
U.S. Cl. 210—321                                6 Claims

ABSTRACT OF THE DISCLOSURE

A dialysis device having pairs of semi-permeable membranes between spacing discs and inlet channels passing transversely therethrough and a dialysis zone, and having channels for distributing the liquids so introduced to the dialysis zone, the channels being so arranged that the distance from the inlet to the dialysis zone is substantially the same for each of the channels so that velocity and pressure of flow throughout the dialysis zone is substantially uniform.

---

The present invention relates to dialysis means for purifying blood or other liquids, where the impurities in the blood will diffuse through semipermeable diaphragms restricting the liquid blood and will enter a purifying liquid by means of which the impurities are removed. The said diaphragms are disposed in pairs between spacing discs forming spaces for the purifying liquid together with the exterior sides of the double diaphragms, and where a package of discs and double diaphragms is perforated by apertures for the blood and the purifying liquid, from which apertures distributing grooves extend in the spacing discs to the spaces where the dialysis takes place.

In order to obtain an even distribution of the liquids in the dialysis means it is necessary to have a plurality of distributing grooves. In that case there is, however, a considerable risk that there will be a flow of varying strength in the different distribution grooves. This is particularly true about the distribution grooves for the blood, and the result may be that great parts of the dialysis means will operate at reduced effect.

The present invention solves these problems by providing the dialysis means with one or more distribution passages in the surfaces of the spacing discs transversely of the direction of flow. To the said passages the blood is passed along the said distribution grooves in blood channels formed therebetween the diaphragms, said channels being at least two and preferably several in number and having essentially equal length counted from the aperture formed in the package of spacing discs and up to the transverse distribution passage or passages.

Preferably, restrictions are provided both in the blood channels and in the distribution grooves for the purifying liquid in order to produce an even distribution of the blood and of the purifying liquid.

The distribution grooves for the purifying liquid preferably consist of narrow, deep grooves into which the diaphragms may penetrate only to a small portion of the depth.

The corresponding grooves for forming blood channels between the diaphragms preferably consist of wide and relatively shallow grooves into which the diaphragms will easily penetrate.

Preferably, the said restrictions are provided at the end of the distribution grooves.

The invention is preferably meant to be applied to an artificial kidney of the kind described in U.S. Patent 3,411,630 but may of course also be applied to other similar constructions.

The invention will be described in greater detail in the following with reference to the accompanying drawings showing a preferred embodiment of the invention chosen by way of example.

Figure 3:
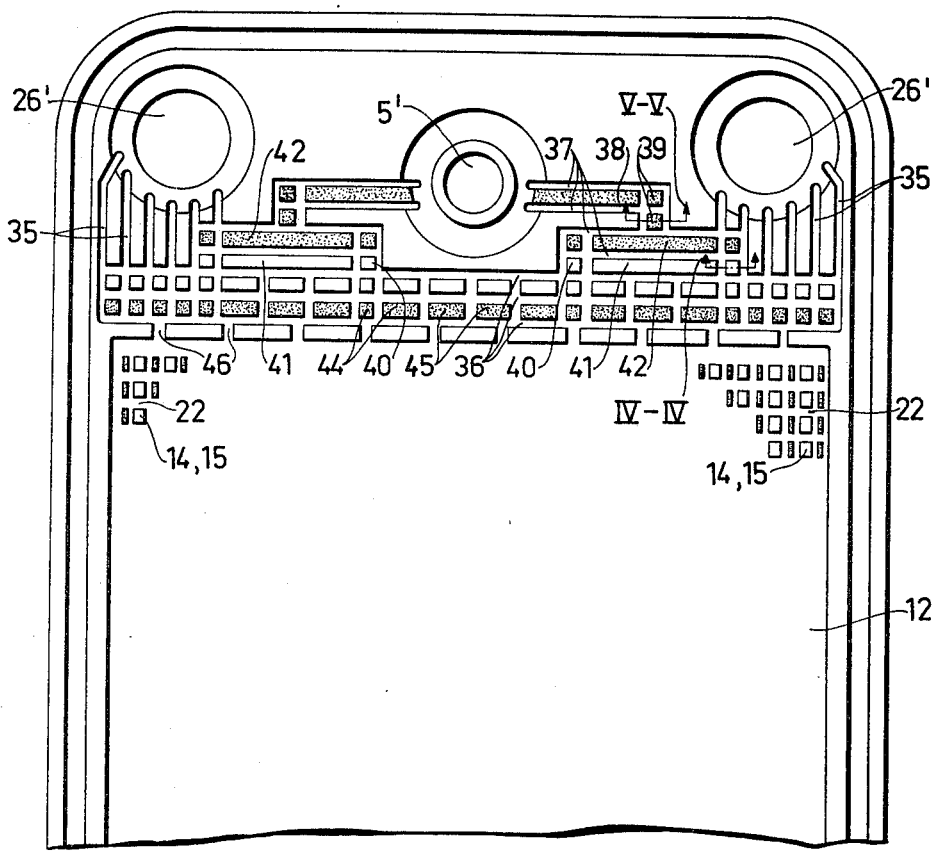
FIG. 3 shows the end portion of a spacing member pertaining to the device according to the invention. The corresponding end portion is preferably made completely symmetrical with the portion shown.
Figure 4:
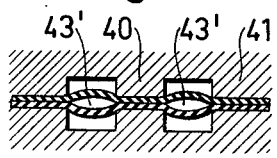
Figure 5:
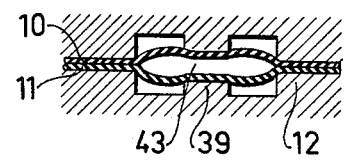

FIGS. 4 and 5, finally, show sections on lines 4—4 and 5—5, respectively, in FIG. 3.

Figure 1:
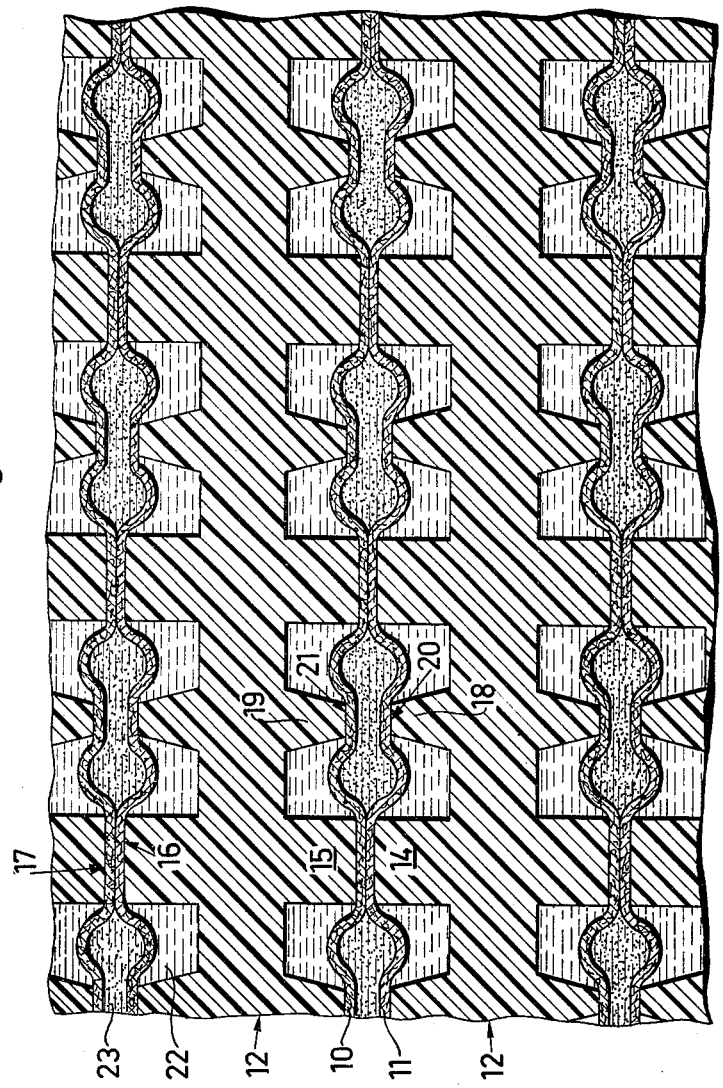
FIG. 1 shows a relatively powerful enlargement of a partial section through a dialysis means according to the invention.
Figure 2:
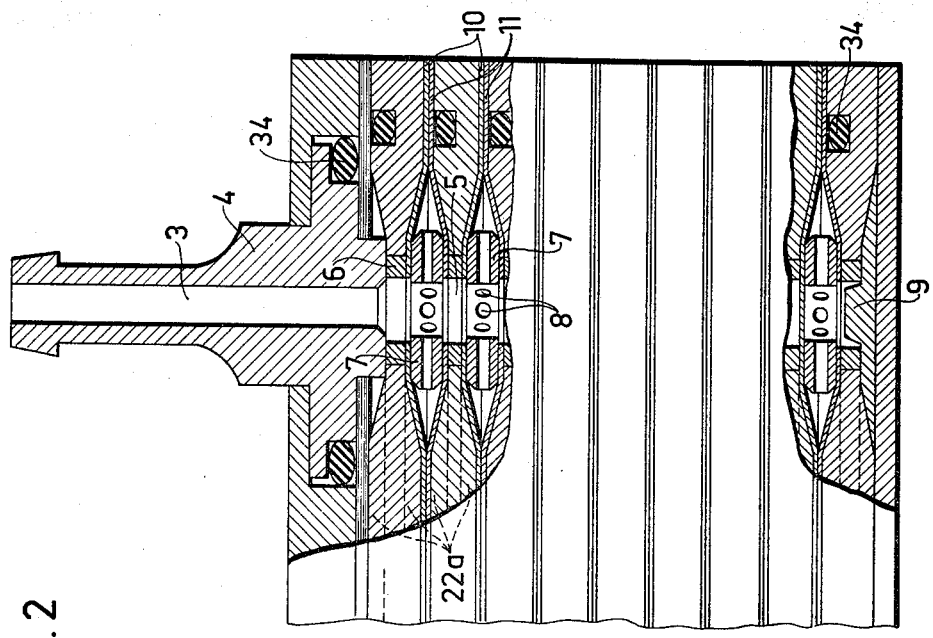
FIG. 2 shows, partly in section, an inlet (or an outlet) for the two kinds of liquid flowing through the means, the main portion of the intermediate spacing discs and the diaphragms being, however, cut away.
Figure 2:
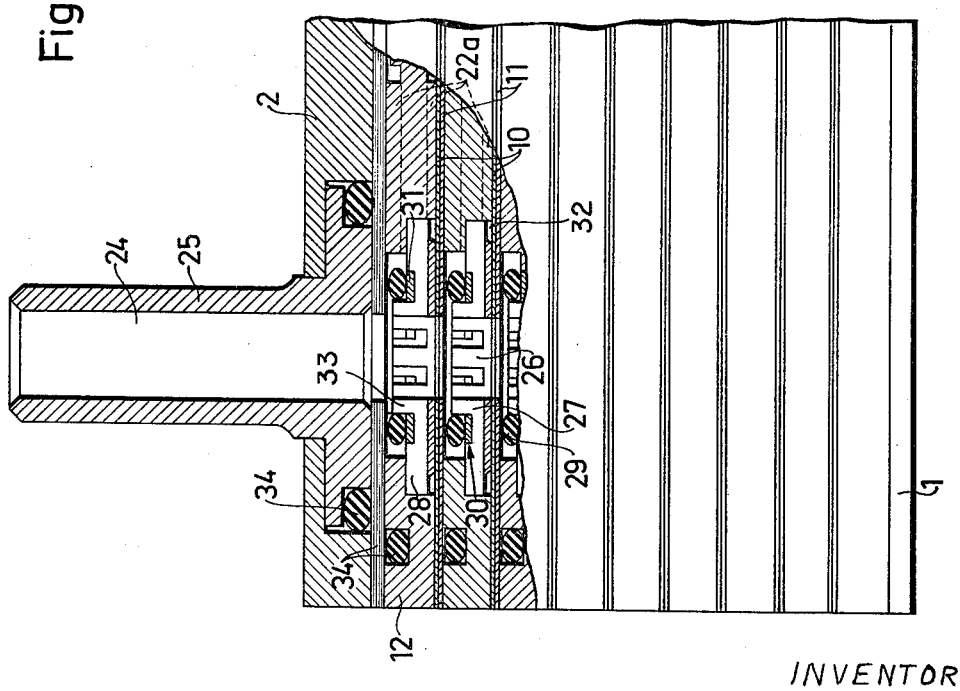

The dialysis means shown in the drawings comprises a base plate 1 and a top plate 2, as is best shown in FIG. 2. Between these plates there are mounted a number of spacing discs 12, as shown in FIGS. 1 and 2. Between the spacing discs 12 there are tensioned semi-permeable diaphragms 10 and 11 in pairs. In order that the means may have a volume which is as carefully determined as possible, the diaphragms 10 and 11 are kept hard pressed together by means of the top surfaces 16 and 17 on a large number of shoulders 14 and 15 provided on each spacing disc. Beside these shoulders, i.e. between adjacent shoulders on the same plate, there are formed channels 22 for the purifying liquid and channels 23 for the blood to be purified. The channels 23 are pressed together a limited extent by the top surfaces 20 and 21 on shoulders 18 and 19. These shoulders 18 and 19 may either be of the same height as the shoulders 14 and 15 or lower than these. FIG. 1 shows the shoulders 18 and 19 to be lower than the shoulders 14 and 15. The area of surfaces 20 and 21 for the shoulders 18 and 19 are essentially smaller than the area of top surfaces 16 and 17 of the shoulders 14 and 15.

As is best shown in FIG. 2, the blood may be introduced through an aperture 3 in an inlet member 4. From there it is passed through a through aperture 5 formed by sealing rings 6 and small buttonlike rings 7. The latter rings 7 are disposed between the two diaphragms 10 and 11 in the respective pairs of such diaphragms. From the central aperture 5 the blood is allowed to pass out between the diaphragms through radially directed channels 8. The aperture 5 is plugged below by an end washer 9.

The purifying liquid, which is preferably a salt solution, e.g. of common salt, is made to enter through an aperture 24 in an inlet member 25. The said aperture continues directly in a through aperture 26, which is formed by a number of annular plates 27. From the inner central aperture 26 a number of radial channels 28 provide even distribution. These channels 28 are disposed on the surface of the plate 27 contrary to what is the case with the blood distribution channels 8.

On the top of each plate 27 there is provided a gasket 29, as appears from FIG. 2. This gasket presses the two diaphragms 10 and 11 lying above it against the next plate 27 of the same kind lying thereabove. This provides for an effective sealing for the blood so that it cannot penetrate into the salt solution and vice versa.

Under the great sealing pressure used here there is a considerable risk that the sealing rings 29 will be pressed down into the grooves 28. For this reason the plate 27 is provided with a cut-out portion 30 in which there is mounted a steel ring 31. This ring effectively prevents any tendency to press the sealing ring 29 into the grooves 28.

In order that the plates 27 may easily be fitted in relation to the salt distribution channels 35 shown in FIG. 3, the plates 27 are provided with an outer annular groove 32 which is in communication with each one of the radial grooves 28, FIG. 2. As a result of this the plates 27 do not have to be fit into a determined angular position in relation to the aperatures in the spacing discs 12.

Next to the central passage 26 the plate 27 is provided with an axially directed annular collar 33. Onto this collar the steel ring 31 is first threaded, whereupon the gasket 29 is then mounted. In FIG. 2, finally, reference numeral 34 designates a number of gaskets for sealing a unit.

FIG. 3 shows one end of a spacing disc which is used for the dialysis means according to the invention. The opposite end of the spacing disc 12 is preferably made completely symmetrical with the end shown, for which reason it should be sufficient to show one end. In the following specification it is assumed that the end shown is an inlet end but it may equally well be an outlet end. The plate shown is preferably made by extrusion from a suitable plastic material.

In the spacing discs 12 there are provided apertures 26' in each corner which are meant to receive the plates 27 shown in FIG. 2 with their apertures 26. From the apertures 26' extend distribution grooves 35 for the purifying liquid. The said grooves 35 open into three parallel distribution passages 36 extending transversely of the plate. The distribution grooves 35 and the distribution passage 36 consist of narrow, deep grooves into which the diaphragms 10 and 11 can only be pressed down a short distance. As a result of this ample spaces are formed between the outside of the diaphragms and the spacing disc for carrying the purifying liquid, and at the same time a blood channel is formed between the two diaphragms opposite the grooves and the passages. Grooves 37 corresponding to grooves 35 lead from a central aperture 5' disposed at the end of the plate and intended to receive the blood distribution buttons 7 with their holes 5 as shown in FIG. 2. Between the grooves 37 there are formed various ridges and shoulders 38, 39, 40, 41 and 42. In order to provide ample blood distribution channels 43 (FIG. 5) between the diaphragms 10 and 11, some of these ridges and shoulders are recessed in the surface of the distribution disc 12. For instance the ridges 38 and 42 and the shoulders 39 are recessed in such a way. Recessed portions are shaded in FIG. 3. Certain other shoulders and ridges are not, however, recessed. Examples of these are the shoulders 40 and ridges 41. The difference arising as a result of this will be best apparent when comparing sections IV—IV and V—V shown in FIGS. 4 and 5. Opposite to recessed shoulders and ridges, e.g. the shoulder 39, and ample blood channel 43 is obtained as shown in FIG. 5. Opposite to unrecessed shoulders, e.g. the shoulder 40 (see FIG. 4) only two minor blood distribution channels 43' are obtained, however. As a result of this a restriction of the blood flow is obtained, whereby it is ensured that the blood will be evenly distributed by the various restrictions. As appears from FIG. 3, there are four restrictions of this kind provided with even distribution transversely of the plate. Due to the fact that additional ridges and shoulders 44 which are located between two of the transverse distribution passages 36 are also recessed, a blood distribution channel 45 extending transversely of the plate of the same kind as the blood distribution channel 43 shown in FIG. 5 is also obtained.

Before the purifying liquid is admitted to the dialysis surface proper, it must also pass a number of restricted openings 46. These are ten in number in the embodiment shown and are disposed with even distribution transversely of the plate. These restrictions may consist of grooves of essentially the same kind as the grooves 35 but their total flow area must be less than the area for the grooves 35 within a given transverse section of the spacing disc 12.

As appears from the shaded portions in FIG. 3, the recessed shoulders and ridges form essentially U-shaped blood distribution grooves, the legs of which branch into additional U-shaped grooves as might be described generally as a branched delta configuration. The legs of the latter do not, however, comprise any recessed portions. As a result of this arrangement it is ensured in a very simple manner that all blood distribution channels obtain essentially the same length. This may, however, also be done in several other manners.

Thus, the shape and extent of the various passages or channels may be varied in many ways. Furthermore it is not, of course, always necessary to have two inlet channels for the purifying liquid. It is possible in many cases to have only one.

We claim:

1. In a dialysis device for purifying blood in which pairs of semi-permeable membranes are disposed between spacing discs having channels on the surfaces thereof in a dialysis zone, each pair of membranes having a space therebetween for passage of blood and the spacing discs providing spaces on both sides of each pair of membranes for passage of a purifying liquid so that impurities in the blood are removed therefrom by diffusion through the semi-permeable membranes into the purifying liquid and in which transverse inlet channels are provided through the spacing discs and membranes for introducing the purifying liquid into the spaces therefor and the blood into the space therefor, the improvement comprising a plurality of ridges on the opposed surfaces of the spacing discs adjacent the transverse inlet channel for the blood to form grooves therebetween for permitting distribution of the blood between the membranes to the dialysis zone where impurities in the blood are diffused through the membranes into the purifying liquid, said ridges on opposed discs having corresponding patterns so that the grooves therebetween will provide corresponding channels between the membranes for the distribution of blood said ridges, grooves and corresponding channels being arranged so that the distance from the transverse inlet channel to the dialysis area is substantially the same for all of the distribution blood channels whereby substantially uniform flow in the dialysis zone is obtained.

2. A device as claimed in claim 1 wherein the ridges, grooves and corresponding channels are arranged in a multiple series of interconnected U-shaped patterns to form a branched, delta configuration.

3. A device as claimed in claim 1 wherein the plurality of ridges on the opposed discs extends to the transverse inlet channel for the purifying liquid to provide grooves therebetween for even distribution therefor to the dialysis zone.

4. A device as claimed in claim 3 wherein the grooves for distribution of the purifying liquid are of such narrow width that only a limited penetration of the membrane thereinto can occur whereby the blood channels between the membranes adjacent the narrow channels for the purifying liquid are minimized.

5. A device as claimed in claim 1 wherein the grooves forming the blood distribution channels are of such width that the membrane may penetrate thereinto a major extent to maximize said blood channels between the membranes for the desired passage of blood therethrough.

6. A device as claimed in claim 5 wherein selected ridges are recessed to permit extended penetration of the membranes into the adjacent grooves to enlarge the blood channnles between the membranes.

References Cited

UNITED STATES PATENTS

| | | | |
|---|---|---|---|
| 3,332,746 | 7/1967 | Claff et al. | 210—321 X |
| 3,362,540 | 1/1968 | Bluenle | 210—321 |
| 3,411,630 | 11/1968 | Alwall et al. | 210—321 |
| 3,412,865 | 11/1968 | Lontz et al. | 210—321 |

OTHER REFERENCES

Anthonisen et al., Clinical Experience With the Skeggs-Leonards Type of Artificial Kidney, From The Lancet, Dec. 22, 1956. p. 1277.

REUBEN FRIEDMAN, Primary Examiner

F. A. SPEAR, JR., Assistant Examiner.

U.S. Cl. X.R.

210—456